(12) United States Patent
Li

(10) Patent No.: US 7,558,335 B2
(45) Date of Patent: *Jul. 7, 2009

(54) COMMUNICATION SYSTEM MODULATING/DEMODULATING DATA USING ANTENNA PATTERNS AND ASSOCIATED METHODS

(75) Inventor: Yingxue Li, Exton, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 551 days.

This patent is subject to a terminal disclaimer.

(21) Appl. No.: 11/345,732

(22) Filed: Feb. 2, 2006

(65) Prior Publication Data

US 2006/0193396 A1 Aug. 31, 2006

Related U.S. Application Data

(60) Provisional application No. 60/651,728, filed on Feb. 10, 2005.

(51) Int. Cl.
*H04L 27/12* (2006.01)

(52) U.S. Cl. .................. 375/299; 375/146; 375/267; 342/74; 342/82; 342/360; 342/374; 455/123

(58) Field of Classification Search ............... 375/146, 375/219, 256, 259, 260, 267, 285, 295, 296, 375/299; 342/74, 81, 82, 354, 359, 360, 342/368, 374; 455/63.4, 91, 101, 107, 121, 455/123, 562.1, 575.7
See application file for complete search history.

(56) References Cited

U.S. PATENT DOCUMENTS

| | | | | |
|---|---|---|---|---|
| 5,787,122 A * | 7/1998 | Suzuki | ................... | 375/267 |
| 6,185,258 B1 | 2/2001 | Alamouti et al. | ............. | 375/260 |
| 6,317,411 B1 * | 11/2001 | Whinnett et al. | ............ | 370/204 |
| 6,529,496 B1 * | 3/2003 | Yeom et al. | ................. | 370/345 |
| 6,931,238 B1 * | 8/2005 | Aizawa et al. | .............. | 455/101 |
| 7,333,421 B2 * | 2/2008 | Li | .............................. | 370/208 |
| 2004/0264592 A1 | 12/2004 | Sibecas et al. | .............. | 375/267 |
| 2007/0025467 A1 * | 2/2007 | Li | | |
| 2007/0260958 A1 * | 11/2007 | Li et al. | | |

* cited by examiner

*Primary Examiner*—Dac V Ha
(74) *Attorney, Agent, or Firm*—Allen, Dyer, Doppelt, Milbrath & Gilchrist, P.A.

(57) ABSTRACT

A wireless communication system includes a transmitter comprising a serial-to-parallel converter for converting serial data bits to a parallel bit stream, a signal mapper coupled to the serial-to-parallel converter and an antenna selector coupled to the serial-to-parallel converter. The signal mapper receives as input a first group of bits from the parallel bit stream, and maps the first group of bits to a channel symbol. The antenna selector receives as input a second group of bits from the parallel bit stream. A transmit antenna array is coupled to the antenna selector and to the signal mapper. The transmit antenna array generates a plurality of transmit antenna patterns with one of the transmit antenna patterns being selected for transmitting the channel symbol based upon the second group of bits from the antenna selector.

22 Claims, 3 Drawing Sheets

8PSK

QPSK

COMMUNICATION SYSTEM MODULATING/DEMODULATING DATA USING ANTENNA PATTERNS AND ASSOCIATED METHODS

RELATED APPLICATION

This application claims the benefit of U.S. Provisional Application Ser. No. 60/651,728 filed Feb. 10, 2005, the entire contents of which are incorporated herein by reference.

FIELD OF THE INVENTION

The present invention relates to the field of wireless communication systems, and more particularly, to modulation and demodulation techniques for a wireless data communication system.

BACKGROUND OF THE INVENTION

In wireless data communication systems, information bits are modulated before transmission. Traditional modulation methods include amplitude modulation (AM), frequency modulation (FM) and phase keying modulation (PSK).

In these modulation schemes, a sequence of information bits is mapped to a signal with a unique amplitude, phase and/or frequency. Accordingly, the receiver will perform demodulation to convert received signals back to the information bits.

An example transmitter 10 is illustrated in FIG. 1. A channel encoder 12 provides information bits 14 to a serial-to-parallel converter 16. The output of the serial-to-parallel converter 16 provides 5 channel bits 18(1)-18(5) to a signal mapper 20. The signal mapper 20 maps the 5 channel bits 18(1)-18(5) to a channel symbol 22. Based upon the modulation performed by the signal mapper 20, the modulated channel symbol 22 is then transmitted over the air by a transmit antenna 24.

Each modulation scheme has a bit error rate, and this bit error rate is asymptotically determined by the minimum Euclidean distance between two distinct modulated symbols. To achieve high data rates in evolving wireless standards, high-order modulation schemes such as 16 QAM and 64 QAM are used.

However, these high-order modulation schemes require a higher signal-to-noise (SNR) ratio to achieve certain bit error rates (BER). Modulation schemes that require high SNR to achieve certain bit error rates are adversely affected in multipath fading environments, thus causing the wireless links to be unreliable.

SUMMARY OF THE INVENTION

In view of the foregoing background, it is therefore an object of the present invention to provide a modulation/demodulation scheme that achieves desired bit error rates with reduced signal-to-noise ratios.

This and other objects, features, and advantages in accordance with the present invention are provided by a wireless communication system comprising a transmitter comprising a serial-to-parallel converter for converting serial data bits to a parallel bit stream, a signal mapper coupled to the serial-to-parallel converter and an antenna selector coupled to the serial-to-parallel converter. The signal mapper receives as input a first group of bits from the parallel bit stream, and maps the first group of bits to a channel symbol. The antenna selector receives as input a second group of bits from the parallel bit stream.

The transmitter further comprises a transmit antenna array coupled to the antenna selector and to the signal mapper. The transmit antenna array generate a plurality of transmit antenna patterns with one of the transmit antenna patterns being selected for transmitting the channel symbol based upon the second group of bits from the antenna selector.

Since information bits are modulated by an antenna pattern, different bit sequences may be transmitted by different antenna patterns. Due to unique RF characteristics associated with each transmit antenna pattern, a receiver is able to demodulate the transmitted bits. The antenna pattern modulation is also combined with traditional modulation techniques. This combination effectively uses a smaller signal constellation as compared to traditional modulation techniques while achieving the same data transfer rate. Consequently, less transmission power may be used to achieve the same BER.

The plurality of transmit antenna patterns generated by the transmit antenna array may comprise a plurality of omni-directional or directional antenna patterns. The transmit antenna array may comprise a plurality of active antenna elements for forming a phased array. Alternatively, the transmit array may comprise at least one active antenna element and a plurality of passive antenna elements for forming a switched beam antenna.

The transmitter periodically transmits reference signals from each transmit antenna pattern generated by the transmit antenna array. The wireless communication system further comprises a receive antenna array, and a receiver coupled to the receive antenna array. The receiver may comprise a channel estimator for receiving the periodically transmitted reference signals from each transmit antenna pattern, and estimates radio frequency (RF) characteristics between each respective transmit antenna pattern and the receive antenna.

The receiver further comprises a demodulator coupled to the channel estimator for receiving the transmitted channel symbol, for determining which channel symbol was transmitted and which transmit antenna pattern was used to transmit the channel symbol. The demodulator determines which channel symbol was transmitted and which transmit antenna pattern transmitted the channel symbol by comparing the channel symbol to the estimated channel symbols transmitted from each transmit antenna pattern.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A wireless data communications system in accordance with the present invention combines antenna pattern modulation with traditional modulation techniques. This combination effectively uses a smaller signal constellation as compared to using only traditional modulation techniques to achieve the same data transfer rate. Moreover, this combination requires less transmission power to achieve the same bit error rate (BER).

Figure 2:
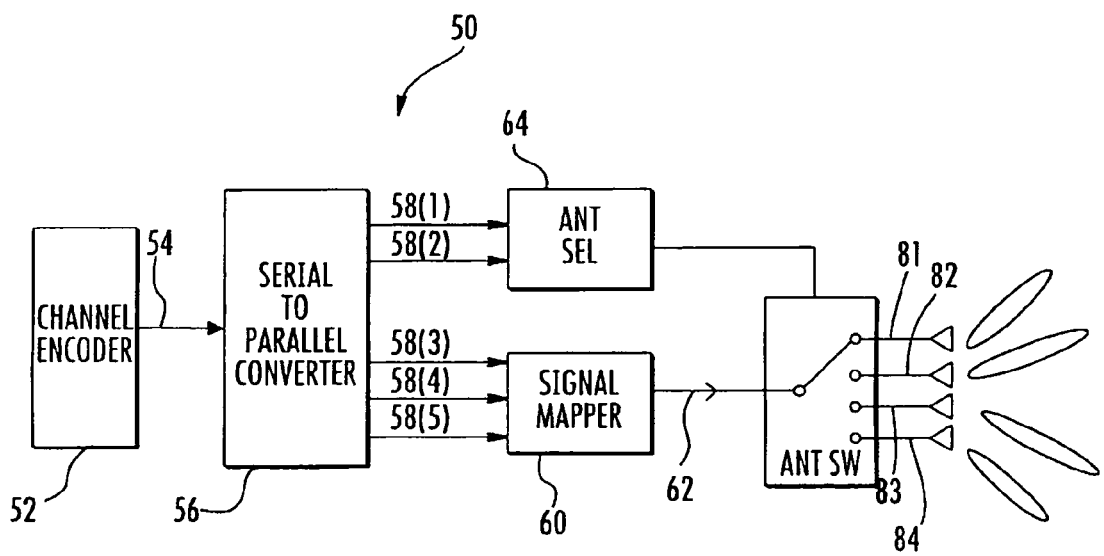
FIG. 2 is a block diagram of a transmitter in accordance with the present invention.

Referring now to FIG. 2, the illustrated transmitter 50 includes a channel encoder 52 providing information bits 54 to a serial-to-parallel converter 56. The output of the serial-to-parallel converter 56 is divided into two groups.

Figure 1:
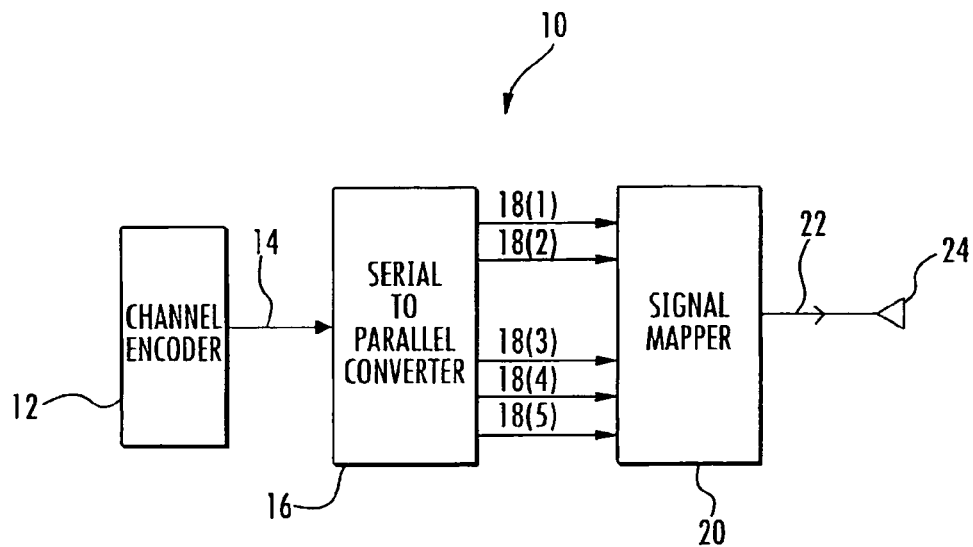
FIG. 1 is a block diagram of a transmitter in accordance with the prior art.

For comparison purposes, the serial-to-parallel converter 56 outputs the same number of bits 58(1)-58(5) as the serial-to-parallel converter 16 in FIG. 1. The 5 information bits are only an example, with the actual number of bits varying based upon the intended application, as readily appreciated by those skilled in the art.

The 5 information bits 58(1)-58(5) output by the serial-to-parallel converter 56 in FIG. 2 are separated into first and second groups. The first group includes 3 channel bits 58(4), 58(5) and 58(6) that are input to a signal mapper 60. The second group includes 2 antenna selection bits 58(1) and 58(2) which are input to an antenna selector 64.

The signal mapper 60 modulates the 3 channel bits 58(4)-58(6) for generating a channel symbol 62. Since there are 3 information bits, the modulation may be 8PSK. In contrast, the signal mapper 20 in FIG. 1 is 32QAM since each symbol is made up of 5 information bits.

As readily understood by those skilled in the art, the signal mapper 20 in FIG. 1 generates a signal constellation with 32 possible symbol points on an x-y plane, whereas the signal mapper 60 in FIG. 2 only generates a signal constellation with 8 possible symbol points on the x-y plane.

For the transmitter 50 to generate an equivalent 32 symbol points in the x-y plane, antenna pattern modulation is used. The antenna selector 64 selects one of 4 antenna elements 81, 82, 83, 84 to transmit the channel symbol 62. The 4 antenna elements 81-84 are uncorrelated so that 4 different antenna patterns are generated. Since each of the 8 possible symbol points can be transmitted using a different antenna pattern, 32 possible symbols can be detected by a receiver 90.

The antenna modulation is not limited to the illustrated embodiment. As an alternative, an antenna array with two elements may be used for generating more than two antenna patterns by applying different weights to each element of the antenna array. Consequently, the antenna array may be a phased array antenna or a switched beam antenna, for example.

The applicable antenna patterns for the antenna array may be directional or omni-directional. When there is more than one omni-directional antenna, each omni-directional antenna will still be seen differently by the receiver due to multipath fading.

An advantage in using the signal mapper 60 in FIG. 2 is that is has a smaller signal constellation as compared to the signal mapper 20 in FIG. 1. The signal constellation for the 8PSK modulation used by the signal mapper 62 is significantly less than the signal constellation for the 32QAM modulation used by the signal mapper 20. Therefore, for the same transmission power, the minimum distance between two distinct signal points of 8PSK constellation is much greater than the minimum distance between two distinct signal points of 32QAM constellation. Consequently, to achieve the same BER, it will require less transmission power when 8PSK modulation is used as opposed to when 32QAM modulation is used.

In this specific example, the signal constellation size for the signal mapper 62 is one-quarter the size of the signal constellation for the signal mapper 20. Nonetheless, the data rate for the data being transmitted from each transmitter 10, 50 is the same. Under certain circumstances, the transmitter 50 in accordance with the present invention requires less transmission power to achieve the same quality of service or cover a wider range with the same quality of service.

For a receiver 90 to measure the RF characteristics of each antenna 81-84, known reference bits are periodically transmitted by the transmitter 50. These reference bits are referred to as pilot bits, for example.

Figure 3:
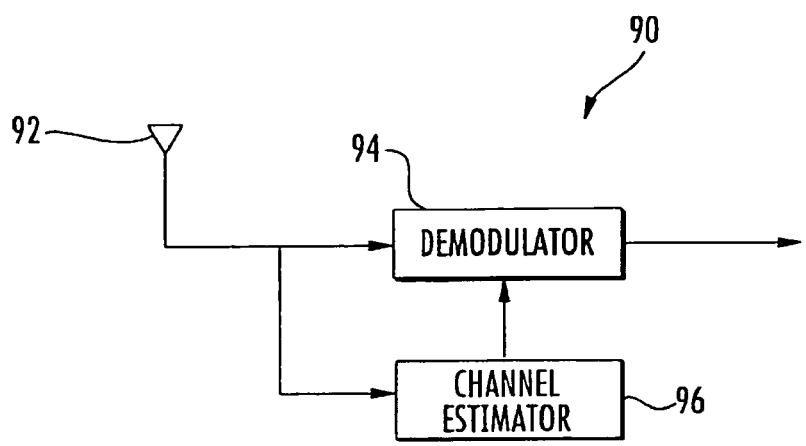
FIG. 3 is a block diagram of a receiver in accordance with the present invention.

A block diagram of the receiver 90 for receiving the antenna modulated channel symbols is provided in FIG. 3. A receive antenna array 92 receives a signal that includes the antenna modulated channel symbols. The receive antenna array 92 may comprise one or more antenna elements for generating one or more receive antenna patterns.

The received signal is applied as input to a demodulator 94 and to a channel estimator 96. The channel estimator 96 extracts known reference bits from the received signal. These reference bits, which may be pilot bits, for example, are used to estimate the radio frequency (RF) characteristics of the received signal associated with each transmit and receive antenna pair. The channel estimator 96 estimates the RF characteristics.

The RF characteristics of the received signal associated with each transmit and receive antenna pair may include attributes such as amplitude, phase, delay spread and frequency response. The estimated RF characteristics for each transmit and receive antenna pair are then sent to the demodulator 94.

The demodulator 94 computes the Euclidean distance (ED) between the received signal and the estimated signals associated with each transmit and receive antenna pair. The demodulator 94 chooses the bits associated with the smallest Euclidean distance as the final output.

Figure 4:
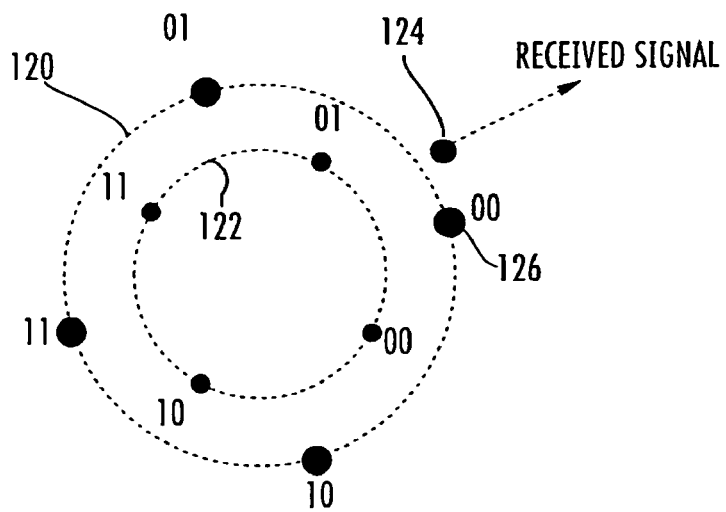
FIG. 4 is a mapping of superimposed QPSK signal constellations in accordance with the present invention.

The demodulator 94 will now be described in greater detail while referring to the superimposed constellation as shown in FIG. 4. Assume QPSK modulation is used for the channel symbols. The receiver would then see a superimposed constellation consisting of two subsets of QPSK constellation. The outer ring constellation is indicated by reference numeral 120, and the inner ring constellation is represented by 122.

The inner ring 122 represents possible received signals if the channel symbol was transmitted over one antenna (say, antenna 0). The outer ring 120 represents four possible received signals if the channel symbol was transmitted over another antenna (say, antenna 1). When the receiver receives a signal 124, the demodulator 94 calculate the distance between the received signal and each of eight candidates (four on the inner ring 122 assuming antenna 0 was used, and four on the outer ring 120 assuming antenna 1 was used. The demodulator 94 then selects the point which is nearest to the received signal 124. In this example, the dot 126 corresponding to channel bits 00 would be selected. Once the signal point is selected, the receiver then knows that the channel bits are 00 and the antenna selection bit is 1 since the selected point is on the outer ring 120.

The calculation of the Euclidean distance may depend on the RF characteristics. An example is given below to demonstrate how the Euclidean distance is calculated, and how this provides better performance.

In this example, a narrow band system is considered, where RF characteristics between each transmit and receive antenna pair is represented by a complex channel gain. An uncorrelated Rayleigh channel model is also assumed in this example, which means each channel gain is a zero mean complex Gaussian random variable with a variance of 0.5 per dimension. Channel gains of two distinct transmit/receive antenna pairs are uncorrelated. Multiple receive antennas are considered in this example.

Figure 5A:
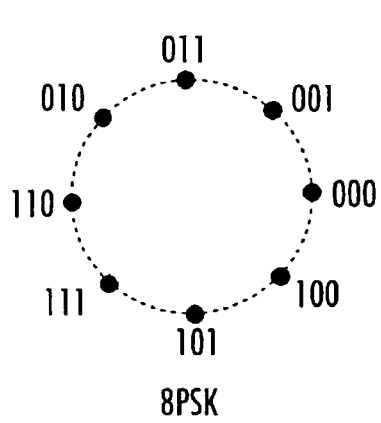
FIG. 5a is a mapping of bits for an 8PSK signal constellation in accordance with the present invention.
Figure 5B:
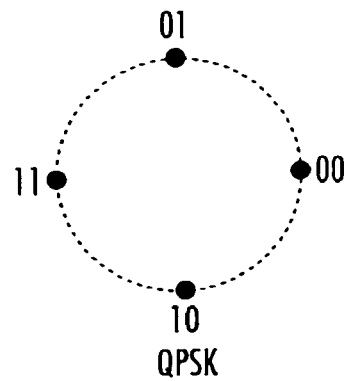
FIG. 5b is a mapping of bits for a QPSK signal constellation in accordance with the present invention.

Mapping of the corresponding bits to the 8PSK and QPSK channel symbols is provided in FIGS. 5a and 5b. Assuming unity energy per information bit, the minimum squared Euclidean distance for the 8PSK signal constellation is:

$$d_8^2 = 3(2-\sqrt{2}) \approx 1.76$$

The minimum squared Euclidean distance for the QPSK signal constellation is:

$$d_Q^2 = 6$$

The signal separation for the QPSK signal constellation is 6, whereas the signal separation for the 8PSK signal constellation is about 1.76. As will be explained in greater detail below, the larger the signal separation between two distinct channel symbols, the easier it is to locate the desired points for demodulation.

A system with M receive antennas will now be considered, where a channel gain between an nth transmit and an mth receiver antenna is $\alpha_{nm}$. In a conventional transmitter, we assume antenna 0 is used. The receiver is a maximum likelihood (ML) receiver that calculates the Euclidean distance between the received signal and each possible channel symbol. The possible channel symbols are calculated between all of the possible transmit and receive antenna pairs using a know reference signal. A decision is made based upon the calculated Euclidean distance. The performance of such a maximum likelihood receiver depends on the minimum squared Euclidean distance between two distinct channel symbols received by the receiver 90.

If bit sequence S0 results in channel symbol x0 and antenna selection command p, and bit sequence S1 results in channel symbol x1 and antenna selection command q, then the squared Euclidean distance between two received channel symbols is calculated as:

$$d^2 = \sum_{m=0}^{M-1} |\alpha_{pm} x_0 - \alpha_{qm} x_1|^2$$

For the conventional method, the minimum squared Euclidean distance between two distinct channel symbols becomes:

$$d_C^2 = d_8^2 \sum_{m=0}^{M-1} |\alpha_{0m}|^2 \qquad \text{Equation 1}$$

For the modified transmitter 50, the minimum squared Euclidean distance is:

$$d_I^2 = \min\left(d_4^2 \sum_{m=0}^{M-1} |\alpha_{nm}|^2, \min_{k=0}^{3}\left(3 \cdot \sum_{m=0}^{M-1} |\alpha_{0m} - \alpha_{1m} e^{jk\pi/2}|^2\right)\right) \qquad \text{Equation 2}$$

The first term in the outer parentheses corresponds to the case where two channel symbols are transmitted from the same antenna. The subscript n can be either 0 or 1. The second term corresponds to the case where the two channel symbols are transmitted from different antennas.

When the number of receive antennas M become large, we intuitively have:

$$\min_{k=0}^{3}\left(3 \cdot \sum_{m=0}^{M-1} |\alpha_{0m} - \alpha_{1m} e^{jk\pi/2}|^2\right) \approx 3 \cdot \sum_{m=0}^{M-1} |\alpha_{0m} - \alpha_{1m}|^2 \qquad \text{Equation 3}$$

Using Equation 3 and averaging Equation 1 and 2 with respect to complex channel fading, we have the average minimum squared Euclidean distance for the conventional transmitter and the modified transmitter 50 as follows:

$$d_{C,avg}^2 = d_8^2 M \approx 1.76 M$$

$$d_{I,avg}^2 \approx d_Q^2 M = 6 M$$

The modified transmitter 50 clearly provides a larger separation between two distinct channel symbols as compared to the conventional method. The improvement corresponds to about 5 dB gain when the number of receive antennas M is large.

Figure 6:
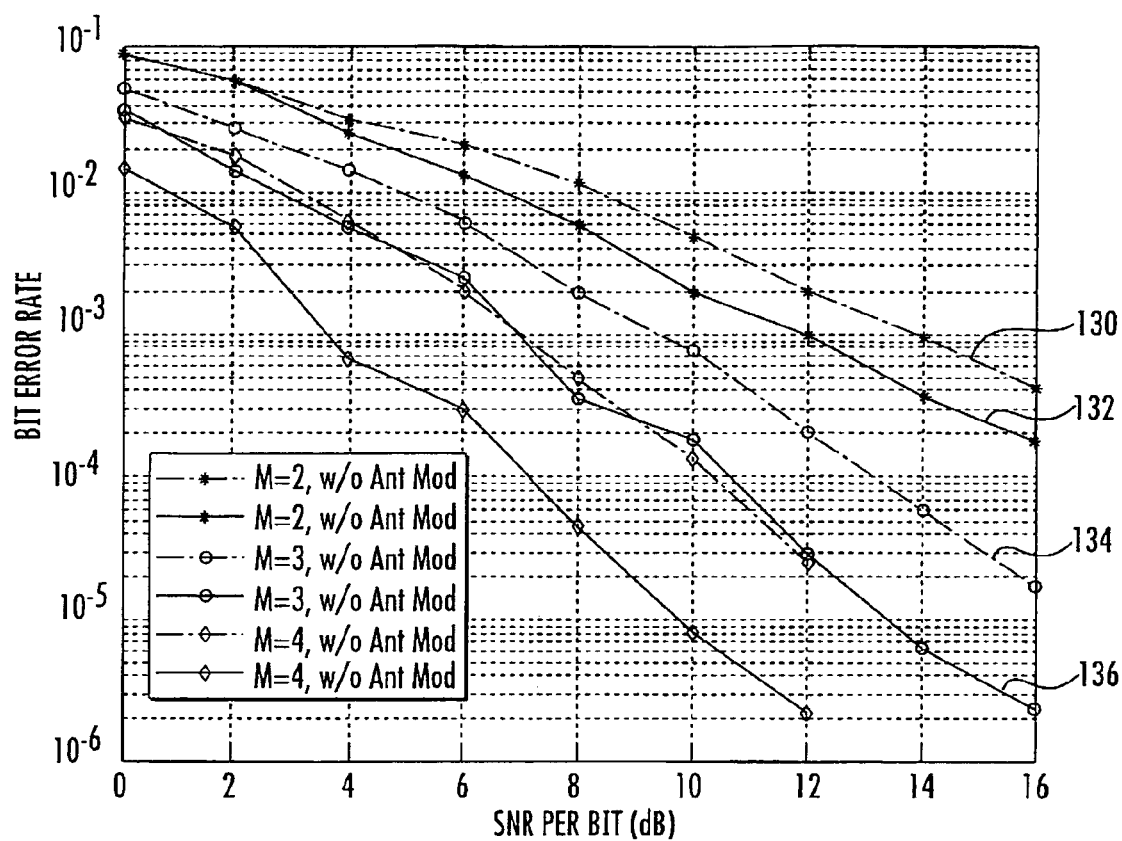
FIG. 6 is a performance comparison between prior art communication systems versus communication systems in accordance with the present invention.

A graph illustrating simulation results comparing the conventional or prior art method with the modified method in accordance with the invention is provided in FIG. 6 when the number of receive antenna elements M respectively equals 2, 3 and 4. When the number of receive antennas increases, performance of both the conventional and the modified methods improve.

Line 130 corresponds to M=2 for a conventional transmitter without antenna pattern modulation, and line 132 also corresponds to M=2 but with antenna pattern modulation. For the same signal-to-noise ratio (SNR), the BER is lower with the antenna pattern modulation. To achieve the same BER, it requires less SNR with antenna modulation than without. For instance, to achieve 0.1% BER, the conventional approach without antenna modulation would require 14 dB SNR, while 12 dB is adequate to achieve the same BER for the invention. There is a 2 dB advantage for the present invention.

Similarly, line 134 corresponds to M=3 for a conventional transmitter without antenna pattern modulation, and line 136 also corresponds to M=3 but with antenna pattern modulation. Yet again, Line 137 corresponds to M=4 for a conventional transmitter without antenna pattern modulation, and line 139 also corresponds to M=4 but with antenna pattern modulation.

As shown in the figure, the performance of the modified method improves faster than the conventional method. The gap between the modified and conventional methods increases as M increases.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communication system comprising:
   a transmitter comprising
      a serial-to-parallel converter for converting serial data bits to a parallel bit stream,
      a signal mapper receiving as input a first group of bits from the parallel bit stream, and mapping the first group of bits to a channel symbol, and
      an antenna selector receiving as input a second group of bits from the parallel bit stream;
   a transmit antenna array coupled to said antenna selector and to said signal mapper, said transmit antenna array for generating a plurality of transmit antenna patterns with one of the transmit antenna patterns being selected for transmitting the channel symbol based upon the second group of bits from said antenna selector.

2. A wireless communication system according to claim 1 wherein the plurality of transmit antenna patterns comprises a plurality of directional antenna patterns.

3. A wireless communication system according to claim 1 wherein the plurality of transmit antenna patterns comprises a plurality of omni-directional antenna patterns.

4. A wireless communication system according to claim 1 wherein said transmitter periodically transmits reference signals from each transmit antenna pattern.

5. A wireless communication system according to claim 4 further comprising:
   a receive antenna array; and
   a receiver coupled to said receive antenna array and comprising a channel estimator for receiving the periodically transmitted reference signals from each transmit antenna pattern, and estimating radio frequency (RE) characteristics between each respective transmit antenna pattern and said receive antenna.

6. A wireless communication system according to claim 5 further comprising a demodulator coupled to said channel estimator for receiving the transmitted channel symbol, for determining which channel symbol was transmitted and which transmit antenna pattern was used to transmit the channel symbol.

7. A wireless communication system according to claim 6 wherein said demodulator determines which channel symbol was transmitted and which transmit antenna pattern transmitted the channel symbol by comparing the channel symbol to the estimated channel symbols transmitted from each transmit antenna pattern.

8. A wireless communication system according to claim 4 wherein said receive array comprises one or more antenna elements for generating one or more receive antenna patterns.

9. A wireless communication system according to claim 1 further comprising a channel encoder for providing the serial data bits to said serial-to-parallel converter.

10. A wireless communication system according to claim 1 wherein said transmit antenna array comprises a plurality of active antenna elements for forming a phased array.

11. A wireless communication system according to claim 1 wherein said transmit array comprises at least one active antenna element and a plurality of passive antenna elements for forming a switched beam antenna.

12. A method for communicating between a transmitter and a receiver in a wireless communication system, the method comprising:
   converting serial data bits to a parallel bit stream in the transmitter;
   dividing the parallel bit stream into a first group of bits and into a second group of bits in the transmitter;
   providing the first group of bits to a signal mapper for mapping the first group of bits to a channel symbol in the transmitter;
   providing the second group of bits to a transmit antenna selector, the transmit antenna selector being coupled to a transmit antenna array for generating a plurality of transmit antenna patterns; and
   selecting one of the transmit antenna patterns for transmitting the channel symbol based upon the second group of bits from the transmit antenna selector.

13. A method according to claim 12 wherein the plurality of transmit antenna patterns comprises a plurality of directional antenna patterns.

14. A method according to claim 12 wherein the plurality of transmit antenna patterns comprises a plurality of omni-directional antenna patterns.

15. A method according to claim 12 further comprising periodically transmitting reference signals from each transmit antenna pattern.

16. A method according to claim 15 further comprising:
   receiving at a receive antenna array coupled to the receiver the periodically transmitted reference signals from each transmit antenna pattern; and
   estimating in the receiver radio frequency (RF) characteristics between each respective transmit antenna pattern and the receive antenna.

17. A method according to claim 16 further comprising determining which channel symbol was transmitted and which transmit antenna pattern was used to transmit the channel symbol.

18. A method according to claim 17 wherein determining which channel symbol was transmitted and which antenna pattern transmitted the channel symbol comprises comparing the channel symbol to the estimated channel symbols transmitted from each transmit antenna pattern, received signal to the estimated channel symbols transmitted from each transmit antenna pattern.

19. A method according to claim 16 wherein the receive array comprises one or more antenna elements for generating one or more receive antenna patterns.

20. A method according to claim 12 further comprising encoding the serial data bits.

21. A method according to claim 12 wherein the transmit antenna array comprises a plurality of active antenna elements for forming a phased array.

22. A method according to claim 12 wherein the transmit array comprises at least one active antenna element and a plurality of passive antenna elements for forming a switched beam antenna.

* * * * *